(12) United States Patent
Huang

(10) Patent No.: US 7,693,275 B2
(45) Date of Patent: Apr. 6, 2010

(54) ONLINE SERVICE SYSTEM CAPABLE OF PREDICTING WAITING TIME

(75) Inventor: Wen-Chen Huang, Kaohsiung (TW)

(73) Assignee: National Kaohsiung First University of Science and Technology, Kaohsiung (TW)

( * ) Notice: Subject to any disclaimer, the term of this patent is extended or adjusted under 35 U.S.C. 154(b) by 1030 days.

(21) Appl. No.: 11/401,257

(22) Filed: Apr. 11, 2006

(65) Prior Publication Data
US 2007/0263836 A1   Nov. 15, 2007

(51) Int. Cl.
*H04M 3/00*   (2006.01)
*H04M 5/00*   (2006.01)

(52) U.S. Cl. .......................... 379/266.06; 379/266.01; 379/266.03; 379/266.07; 379/266.08

(58) Field of Classification Search ................ 379/266.01–266.08

See application file for complete search history.

(56) References Cited

U.S. PATENT DOCUMENTS 6,023,681 A * 2/2000 Whitt .......................... 705/8

* cited by examiner

*Primary Examiner*—Quynh H Nguyen
*Assistant Examiner*—Oleg Asanbayev
(74) *Attorney, Agent, or Firm*—Rosenberg, Klein & Lee

(57) ABSTRACT

The present invention discloses an online service system capable of predicting waiting time. The service system serves the users through a queuing mode and an electronic whiteboard mode. The queuing mode comprises a queuing-user counting unit for counting number of the user entering the queuing mode, a service channel counting unit for counting number of the service channels providing service, and a waiting-time prediction unit for predicting and showing the waiting time to the queuing users. Alternatively, the queuing users can search for related information from the database through a search engine. Once the service channel is available, the queuing user can exit from the queuing mode and request for service through the electronic whiteboard mode by transmitting audio/video, picture and character data. The present invention may further provide a performance evaluation mode for the system manager's reference.

7 Claims, 9 Drawing Sheets

| Performance Evaluation For the System Including One Service Channel | |
|---|---|
| $\lambda$ | 0.1 |
| $\mu$ | 0.12 |
| (1) Probability of no user entering the on-line service system | 0.1667 |
| (2) average number of the users entering the queuing sub-system | 4.1667 |
| (3) average number of the users in the on-line service system | 5.0000 |
| (4) average time for one user spending in the queuing sub-system | 41.6667 |
| (5) average time for one user spending in the on-line service system | 50.0000 |
| (6) Probability of the users waiting for service | 0.8333 |
| Probability of N Users Entering the On-Line Service System | |
| N | Probability |
| 0 | 0.1667 |
| 1 | 0.1389 |
| 2 | 0.1157 |
| 3 | 0.1965 |
| 4 | 0.0804 |
| 5 | 0.0607 |

FIG. 6

| Performance Evaluation For System Including Two Service Channel | |
| --- | --- |
| $\lambda$ | 0.1 |
| $\mu$ | 0.12 |
| (1) Probability of no user entering the on-line service system | 0.4118 |
| (2) average number of the users entering the queuing sub-system | 0.1751 |
| (3) average number of the users in the on-line service system | 1.0084 |
| (4) average time for one user spending in the queuing sub-system | 1.7507 |
| (5) average time for one user spending in the on-line service system | 10.0840 |
| (6) Probability of the users waiting for service | 0.2451 |
| Probability of N Users Entering the On-Line Service System | |
| N | Probability |
| 0 | 0.4118 |
| 1 | 0.3431 |
| 2 | 0.1430 |
| 3 | 0.0596 |
| 4 | 0.0248 |
| 5 | 0.0103 |
| More than 6 | 0.0074 |

FIG. 7

| Performance Evaluation For System Including Three Service Channels | |
|---|---|
| $\lambda$ | 0.1 |
| $\mu$ | 0.12 |
| (1) Probability of no user entering the on-line service system | 0.4321 |
| (2) average number of the users entering the queuing sub-system | 0.0222 |
| (3) average number of the users in the on-line service system | 0.8555 |
| (4) average time for one user spending in the queuing sub-system | 0.2220 |
| (5) average time for one user spending in the on-line service system | 0.5553 |
| (6) Probability of the users waiting for service | 0.0577 |
| Probability of N Users Entering the On-Line Service System | |
| N | Probability |
| 0 | 0.4321 |
| 1 | 0.3601 |
| 2 | 0.1500 |
| 3 | 0.0417 |
| 4 | 0.0116 |
| More than 5 | 0.0045 |

FIG. 8

| Ratio λ/μ | Amount of the Service Channels | | | |
|---|---|---|---|---|
| | 2 | 3 | 4 | 5 |
| 0.15 | 0.8605 | 0.8607 | 0.8607 | 0.8607 |
| 0.20 | 0.8182 | 0.8187 | 0.8187 | 0.8187 |
| 0.25 | 0.7778 | 0.7788 | 0.7788 | 0.7788 |
| 0.30 | 0.7391 | 0.7407 | 0.7408 | 0.7408 |
| 0.35 | 0.7021 | 0.7046 | 0.7047 | 0.7047 |
| 0.40 | 0.6667 | 0.6701 | 0.6703 | 0.6703 |
| 0.45 | 0.6327 | 0.6373 | 0.6376 | 0.6376 |
| 0.50 | 0.6000 | 0.6061 | 0.6065 | 0.6065 |
| 0.55 | 0.5686 | 0.5763 | 0.5769 | 0.5769 |
| 0.60 | 0.5385 | 0.5479 | 0.5487 | 0.5488 |
| 0.65 | 0.5094 | 0.5209 | 0.5219 | 0.5220 |
| 0.70 | 0.4815 | 0.4952 | 0.4965 | 0.4966 |
| 0.75 | 0.4545 | 0.4706 | 0.4722 | 0.4724 |
| 0.80 | 0.4286 | 0.4472 | 0.4491 | 0.4493 |
| 0.85 | 0.4035 | 0.4248 | 0.4271 | 0.4274 |
| 0.90 | 0.3793 | 0.4035 | 0.4062 | 0.4065 |
| 0.95 | 0.3559 | 0.3831 | 0.3863 | 0.3867 |
| 1.00 | 0.3333 | 0.3636 | 0.3673 | 0.3678 |
| 1.20 | 0.2500 | 0.2941 | 0.3002 | 0.3011 |
| 1.40 | 0.1765 | 0.2360 | 0.2449 | 0.2463 |
| 1.60 | 0.1111 | 0.1872 | 0.1993 | 0.2014 |
| 1.80 | 0.0526 | 0.1460 | 0.1616 | 0.1646 |
| 2.00 | | 0.1111 | 0.1304 | 0.1343 |
| 2.20 | | 0.0815 | 0.1046 | 0.1094 |
| 2.40 | | 0.0562 | 0.0831 | 0.0889 |
| 2.60 | | 0.0345 | 0.0651 | 0.0721 |
| 2.80 | | 0.0160 | 0.0521 | 0.0581 |
| 3.00 | | | 0.0377 | 0.0466 |
| 3.20 | | | 0.0273 | 0.0372 |
| 3.40 | | | 0.0186 | 0.0293 |
| 3.60 | | | 0.0113 | 0.0228 |
| 3.80 | | | 0.0051 | 0.0174 |
| 4.00 | | | | 0.0130 |
| 4.20 | | | | 0.0093 |
| 4.40 | | | | 0.0063 |
| 4.60 | | | | 0.0038 |
| 4.80 | | | | 0.0017 |

FIG. 9

ONLINE SERVICE SYSTEM CAPABLE OF PREDICTING WAITING TIME

BACKGROUND OF THE INVENTION

1. Field of the Invention

The present invention relates to an online service system, and particularly to an online customer service system capable of informing the users waiting time, so that the queuing user can be served through an electronic whiteboard mode as the waiting time ends or a service channel is available. Further, the system manager can evaluate performances of the service channels according to results of the evaluation mode. Therefore, the present invention is suitable for various businesses which emphasize customer services.

2. Related Prior Arts

Customer service is very important to most businesses, for example, insurance companies, banks, broker houses, express companies, air lines, cable TV companies, car companies, telecom companies, etc. Customers may be significantly attracted back and purchase more by good service after sell. Most of the companies own their service centers, and others commit the job to independent service companies.

Conventional methods of customer service include voice mail or personnel in call centers or service desks. Though voice mail costs less than the other methods for the company, the customers could not be satisfied as limited problems and solutions can be acquired. Personnel in a call center may provide better services, but the costs of communication and human source will be much higher. The service desk is another option for service, but it's apparently expensive for the businesses and inconvenient for the customers to arrive at the desk.

Recently, internet is widely applied to various businesses, and thus online customer services become possible and popular. In general, current online service systems can provide message boards, discussion boards, Q&A services or search engines, so that the users can leave messages and then wait for answers or search for solutions from the database.

However, the above systems can not serve the users in real time, and thus is unsatisfying. To solve this problem, the present invention provides an improved online service system which can dynamically show the waiting time to the queuing users and can communicate with the users through an electronic whiteboard mode by transporting audio/video information.

SUMMARY OF THE INVENTION

One object of the present invention is to provide an online service system, which can predict and show waiting time so that the users will determine whether to wait for service or not according to the waiting time.

Another object of the present invention is to provide an online service system, which can serve and answer the users in real time by transmitting audio/video data and pictures/characters or capturing data from desktop through an electronic whiteboard mode.

A further object of the present invention is to provide an online service system, which can evaluate performances of the service channels for the manager's reference.

To achieve the above object, the online service system of the present invention includes a queuing mode composed of a queuing-user counting unit for counting number of the queuing users entering the queuing mode and waiting for service; a service channel counting unit for counting number of the service channel; and a waiting-time prediction unit for predicting and dynamically showing waiting time to the queuing users. The waiting time is determined according to an average service interval obtained from a regression analysis.

The online service system of the present invention can further include an electronic whiteboard mode through which the users can communicate with the available service channels and acquire service. The electronic whiteboard mode preferably includes an audio/video transmitting unit for providing audio/video information, a real-time electronic whiteboard unit for the users' inputting in real time, an animation unit for playing animations, a picture/character transmitting unit for transmitting pictures and characters, and a desktop-capturing unit for capturing data from the desktop.

Furthermore, the online service system of the present invention may includes a performance evaluation mode, which provides performances of the service channels to the manager by calculating probability of the user entering the service channels and number of the users served by the service channels per unit time, and number of the service channels.

According to the above configurations, the users entering the online service system can first enter the queuing mode as all of the service channels are busy. The queuing users will be informed the waiting time predicted by the waiting-time prediction unit, and then exits from the queuing mode till a service channel is available. In accordance with results of the performance evaluation mode, the manager can determine the optimal amount of the service channels with profit and meanwhile satisfy the customers.

BRIEF DESCRIPTION OF THE DRAWINGS

FIGS. 6-8 respectively indicate results of the performance evaluation mode applied to systems including one, two and three service channels.

FIG. 9 indicates probabilities of no user in k service channels when applying the performance evaluation mode.

DETAILED DESCRIPTION OF THE PREFERRED EMBODIMENTS

To clearly explain features of the present invention, preferred embodiments are illustrated with drawings.

Figure 1:
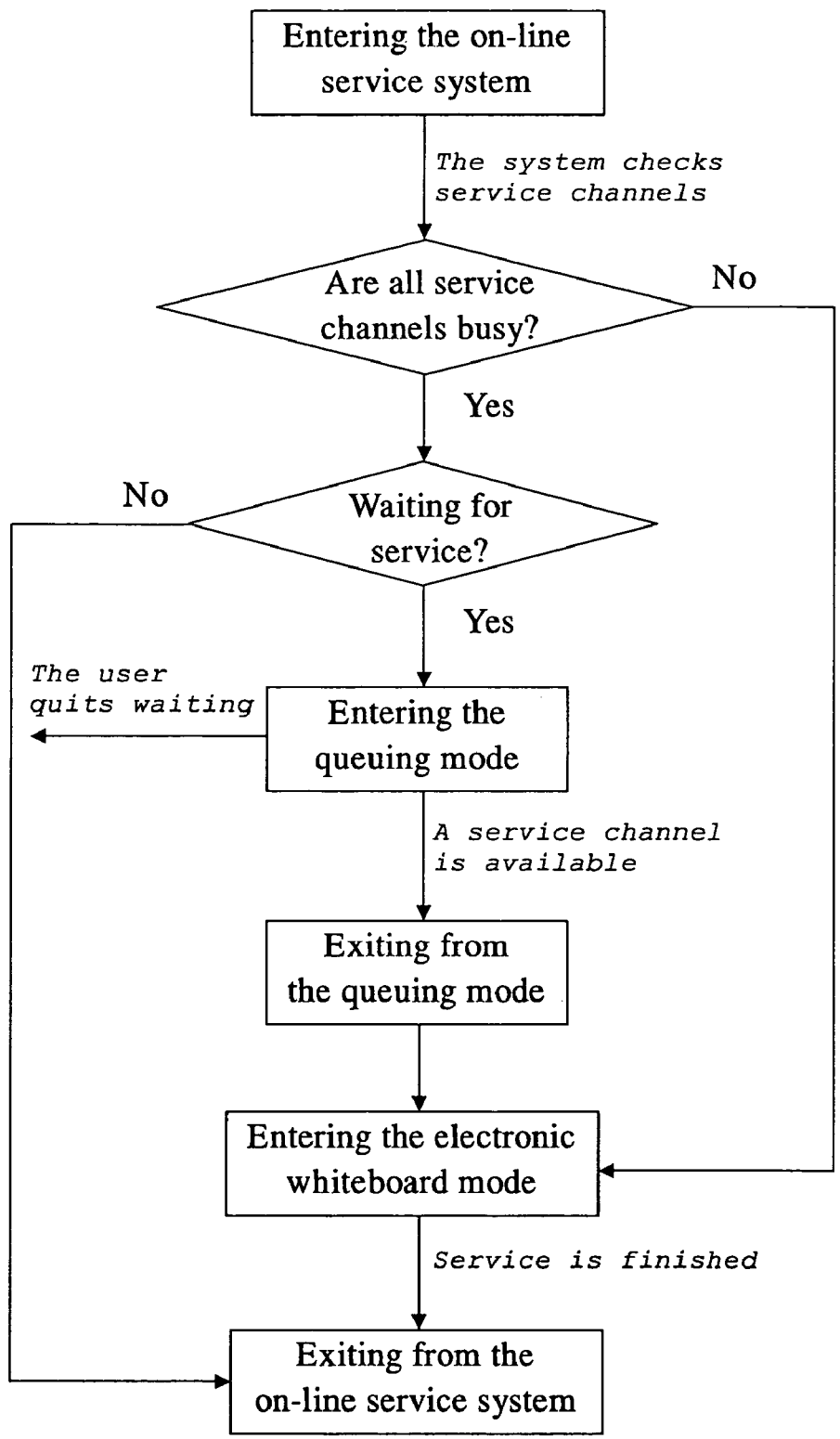
FIG. 1 shows a flowchart of the service system according to the present invention.

FIG. 1 shows a flowchart of an online service system which primarily includes a queuing mode and an electronic whiteboard mode. When a user surfs in the internet and enters the website where the system of the present invention is built, the system will first automatically check whether all of service channels are busy. In case of all service channels being busy, the system will ask the user whether to wait for service or not. If the user selects "NO", he will exit from the system; and if the user selects "YES", he will enter the queuing mode and wait until any service channel is available. Once any service channel is available, the user can exit from the queuing mode and enter the electronic whiteboard mode and request service. In this embodiment, the user will exit from the online service system if exiting from the queuing mode and the electronic whiteboard mode when finishing service. Certainly, the user entering the online service system can directly enter the electronic whiteboard mode and acquire service, if any service channel is available at that time.

In a preferred embodiment, the queuing mode includes a queuing-user counting unit, a service channel counting unit and a waiting-time prediction unit. The queuing-user counting unit counts number of the queuing user entering the queuing mode and waiting for service; the service channel counting unit counts number of the service channel provided for service; and the waiting-time prediction unit predicts and dynamically shows waiting time to the queuing user. The waiting time can be determined according to an average service interval estimated from a regression analysis. Therefore, the user will be clear on how long he could wait for, and then will exit from the queuing mode for being served as the waiting time ends or any service channel is available.

A preferred equation used for the aforementioned regression analysis of the waiting-time prediction unit is:

$$Y=\beta 0+(\beta 1 \times X1)+(\beta 2 \times X2)+(\beta 3 \times X3);$$

wherein Y is a service interval for one user served in one service channel, for example, 1-30 seconds, 31-60 seconds, 61-90 seconds, etc.; X1 is a shorter service interval beyond a reasonable range; X2 is a reasonable or moderate service interval within the reasonable range; X3 is a longer service interval beyond the reasonable range; $\beta 0$, $\beta 1$, $\beta 2$ and $\beta 3$ are regression coefficients determined from a group of practical variables.

Figure 2:
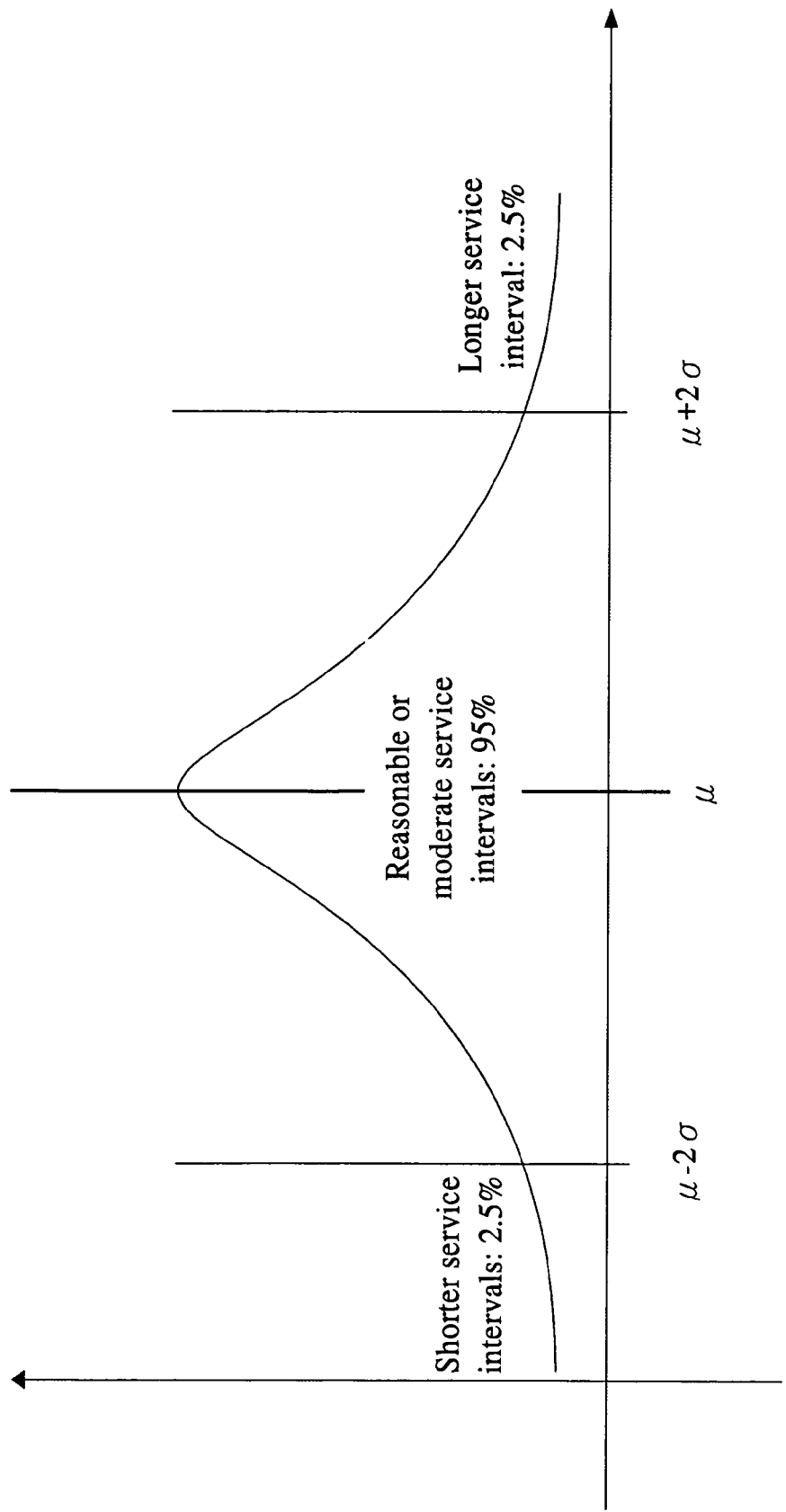
FIG. 2 illustrates the normal distribution according to Chebyshev's Empirical Rule.

The above shorter, reasonable and longer service intervals are varied according to the distribution of service intervals at that time. The reasonable range of service intervals is defined as a range of time that most users spend; and the longer and shorter intervals are respectively intervals a few users spend more and less time than such reasonable range. In a preferred embodiment, Chebyshev's Empirical Rule is applied to the distribution of service intervals. FIG. 2 shows a bell-shaped distribution for N users (N is an integer larger than 1), in which $\mu$ is the average of all service intervals and s is the standard deviation. As illustrated, 95% of the users will have their service intervals ranging from ($\mu$+2s) to ($\mu$−2s) (i.e., the reasonable interval), 2.5% are less than ($\mu$−2s) (i.e., the shorter interval), and 2.5% are more than ($\mu$+2s) (i.e., the longer interval). On the other hand, if N users are served in a duration T, then T can be expressed as follows:

$$T=T1+T2+\ldots +TN, Ti: \text{the ith user's service interval};$$

$$\mu=T/N;$$

$$s=\{[S(Ti-\mu)^2]/N\}^{1/2}; i=1, 2, \ldots, N.$$

In accordance with the above formulae, service intervals can be classified into the reasonable, longer and shorter classes. Further, the manager can input specific parameters to the regression analysis at specific dates, for example, paydays, system updating, usual working days, etc. By means of the regression analysis, average service intervals and demands for the service channels can be predicted and thus regulated in good time.

Figure 3:
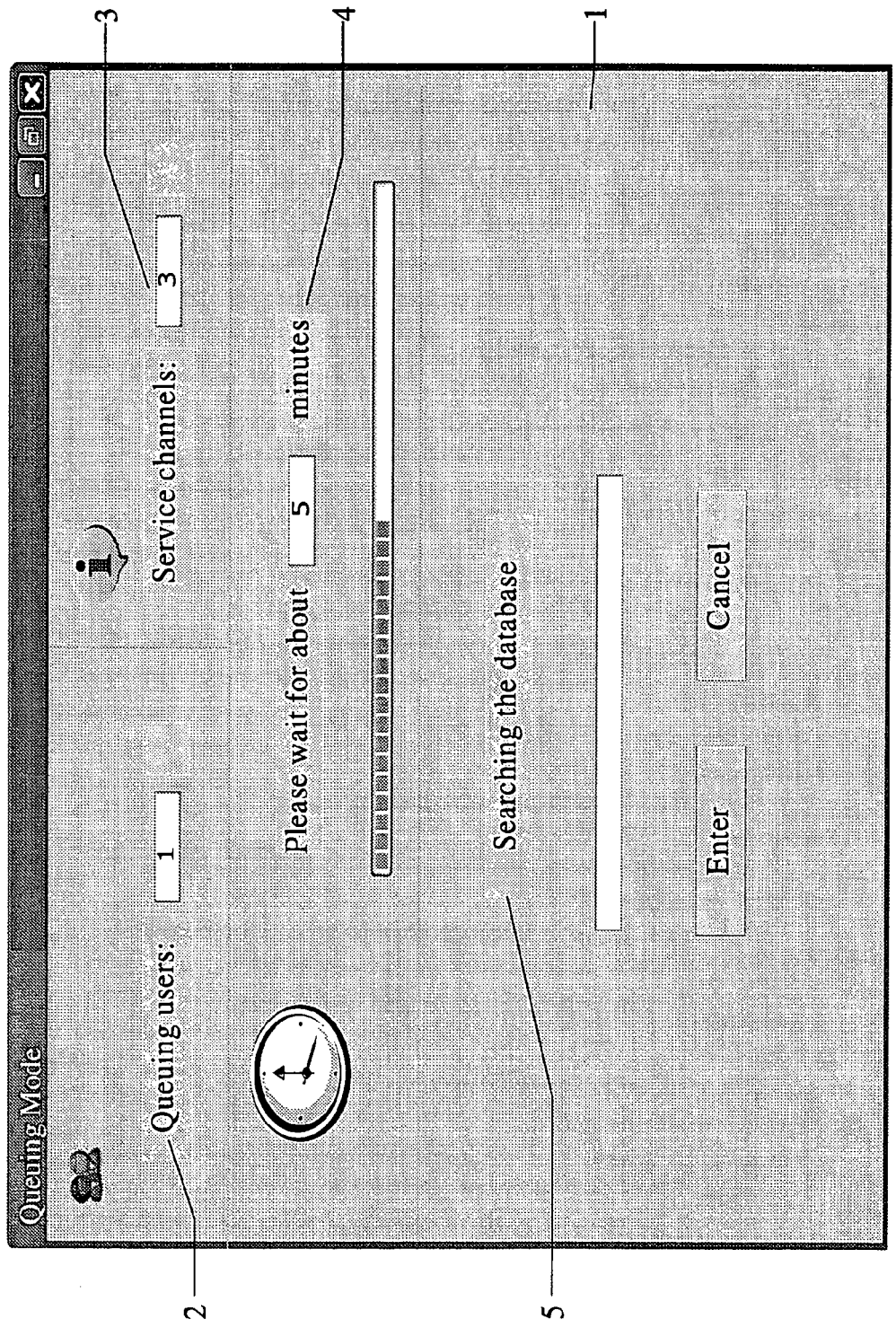
FIG. 3 shows an operation interface for the users entering the queuing mode.

For user's operation, the queuing mode may include an interface (1) as shown in FIG. 3, on which a zone (2) indicates the number of the queuing users waiting for service, a zone (3) indicates the number of the service channels in use, a zone (4) indicates the waiting time for the queuing user, and a zone (5) provides the queuing user to search for desired information from the database of the online service system.

Figure 4:
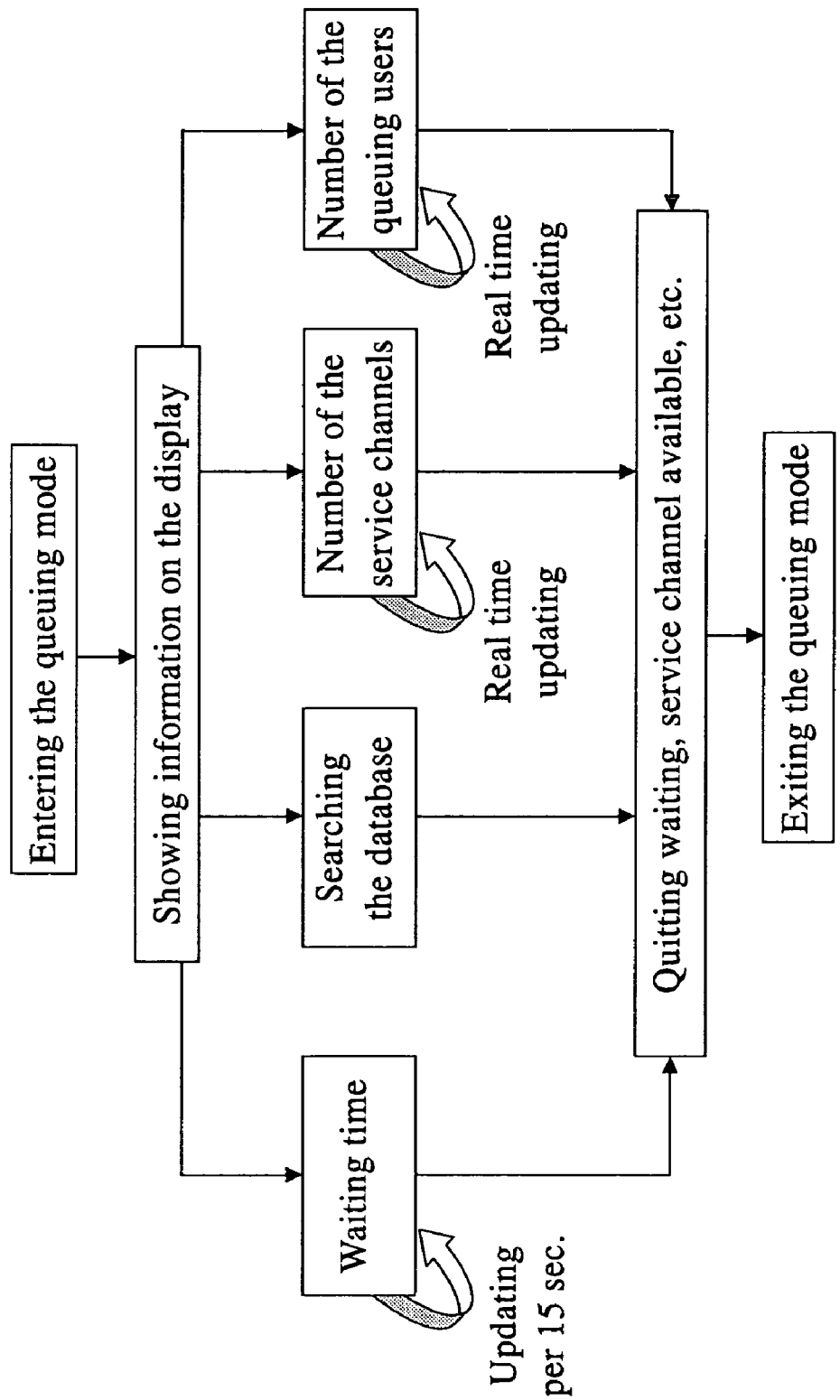
FIG. 4 shows a flowchart of the queuing mode according to the present invention.

FIG. 4 shows a flowchart of the queuing mode with reference to FIG. 3. When the user enters the queuing mode, information will be shown in a display. For example, the zone (2) will indicate how many people are waiting for service prior to him, and then the number will be updated if more people enter the queuing mode; the zone (3) will indicate how many service channels are in use and will be updated if any service channel joins for service or drops out; and meanwhile, the zone (4) will indicate how long the user could spend before acquiring service, and the waiting time can be updated at regular intervals, for example, 15 seconds in this embodiment. Alternatively, the queuing user can enter the zone (5) to search the database for useful information by inputting keywords. The user may exit from the queuing mode as a certain event occurs, for example, quitting waiting voluntarily, computer hanging or crashing, any service channel now available, etc.

Either directly or after exiting from the queuing mode, if a user is served in a service channel for a duration less than the average service interval and exits the online service system, the next queuing user will be served at once, and the waiting time will be dynamically updated for other queuing users.

Contrarily, if a user is being served for a duration more than the average service interval, service time still needed can be estimated within 15 seconds by deducting the duration having been spent from an average of today's longer service intervals. The estimated result can be used to predict and dynamically update the waiting time. Once the user finishes service within the new prediction, the next queuing user can be served immediately and the waiting time is also dynamically updated for other queuing users.

However, if the user is served for longer time than the average of today's longer service intervals, the waiting time will be updated once more according to an average of intervals larger than today's average. Further, if the user is served overtime than today's maximum interval, one more average service interval will be considered into the time still needed, and the waiting time will be dynamically updated again till this service is finished.

In the present invention, the electronic whiteboard mode of the online service system provides users online service in real time. The user entering a service channel can be served through the electronic whiteboard mode, which primarily includes an audio/video transmitting unit for providing audio/video information, a real-time electronic whiteboard unit for inputting and recording data, an animation unit for playing animations, a picture/character transmitting unit for transmitting pictures and characters, and a desktop-capturing unit for capturing information from the desktop.

Figure 5:
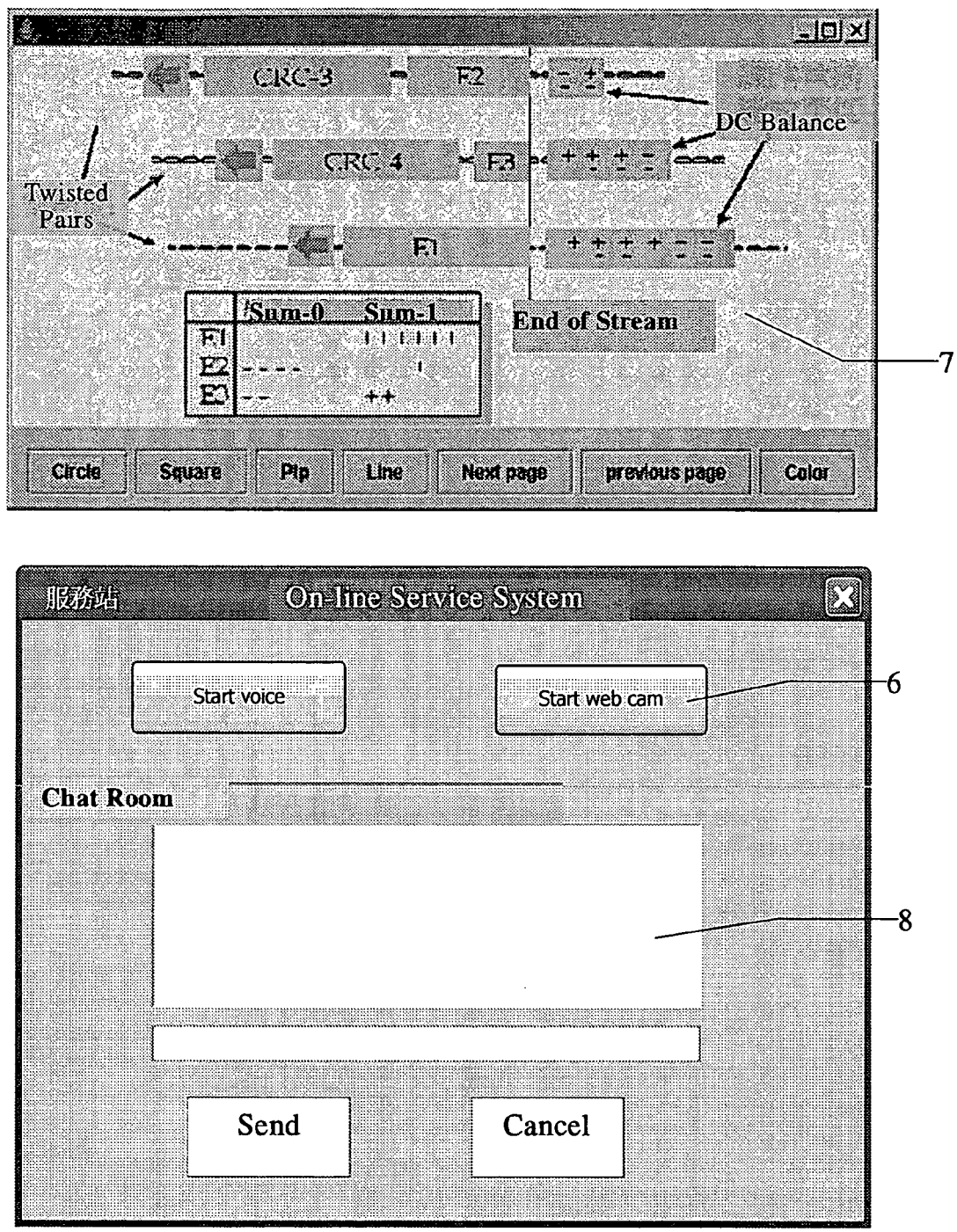
FIG. 5 shows an operation interface for the users entering the electronic whiteboard mode.

In a preferred embodiment, the electronic whiteboard mode is built with the cross-platform JAVA language, and thus a web-based interface is generated. FIG. 5 shows a portion of the interface of the electronic whiteboard mode, which includes an audio/video transmitting unit (6), a real-time electronic whiteboard unit (7) and a picture/character transmitting unit (8). The audio/video transmitting unit (6) with RTP (Real-time Transport Protocol) broadcast function can encode/decode audio/ video data and transport NAT (Network Address Translation) data. The real-time electronic whiteboard unit (7) may have the functions of pen recording, drawing on board, selecting pen colors, eraser and changing slides. The animation unit can access animation files, calculating time, playing and stopping animations. The picture/character transmitting unit (8) may have functions of transmitting and recording pictures and characters, and broadcasting real situation. Through the desktop- capturing unit, the service channel may ask the user to halt at a certain screen and then capture the desktop so as to solve the problem after reviewing this screen.

Preferably, the present invention may further include a performance evaluation mode, which determines the performance of service channels according to probability of users entering the service channels and the number of users served by the service channels per unit time, and number of the service channels. By referring to results of evaluation, the manager can efficiently manage the system. For a system including one service channel, $\lambda$ represents average number of the users entering the system per unit time, $\mu$ represents average number of the users served in the service channel per unit time, and performance of the service channel can be evaluated according to the following formulae:

(1) probability of no user entering the online service system:

$$p_0 = 1 - \frac{\lambda}{\mu}$$

(2) average number of the users entering the queuing mode:

$$Lq = \frac{\lambda^2}{\mu(\mu - \lambda)}$$

(3) average number of the users in the online service system:

$$L = Lq + \frac{\lambda}{\mu}$$

(4) average time for one user spending in the queuing mode:

$$Wq = \frac{Lq}{\lambda}$$

(5) average time for one user spending in the online service system:

$$W = Wq + \frac{1}{\mu}$$

(6) probability of the users waiting for service:

$$p_w = \frac{\lambda}{\mu}$$

(7) probability of N users entering the online service system:

$$p_n = \left(\frac{\lambda}{\mu}\right)^n p_0.$$

For a system including k service channels, $\lambda$ represents average number of the users entering the system per unit time, $\mu$ represents average number of the users served in the service channels per unit time, and performance of the service channels can be evaluated according to the following formulae:

(1) probability of no user entering the online service system:

$$p_0 = \frac{1}{\sum_{n=0}^{k-1} \frac{(\lambda/\mu)^n}{n!} + \frac{(\lambda/\mu)^k}{k!}\left(\frac{k\mu}{k\mu - \lambda}\right)}$$

(2) average number of the users entering the queuing mode:

$$Lq = \frac{(\lambda/\mu)^k \lambda \mu}{(k-1)!(k\mu - \lambda)^2} p_0$$

(3) average number of the users in the online service system:

$$L = Lq + \frac{\lambda}{\mu}$$

(4) average time for one user spending in the queuing mode:

$$Wq = \frac{Lq}{\lambda}$$

(5) average time for one user spending in the online service system:

$$W = Wq + \frac{1}{\mu}$$

(6) probability of the users waiting for service:

$$p_w = \frac{1}{k!}\left(\frac{\lambda}{\mu}\right)^k \left(\frac{k\mu}{k\mu - \lambda}\right) p_0$$

(7) probability of N users entering the online service system:

$$p_n = \frac{(\lambda/\mu)^n}{n!} p_0 \text{ for } n \leq k$$

$$p_n = \frac{(\lambda/\mu)^n}{k! k^{(n-k)}} p_0 \text{ for } n \geq k.$$

To more clearly describe the evaluation process, examples are illustrated as follows. In the examples, six users can enter the system per hour (i.e., $\lambda$=6 users/60 minutes=0.1 user/minute), and the service channels can serve 7.2 users per hour (i.e., $\mu$=7.2 users/60 minutes=0.12 users/minutes). FIGS. 6-8 respectively indicate probabilities calculated according to the above formulae when the performance evaluation mode is applied to systems including one, two and three service channels. FIG. 9 indicates more probabilities calculated according to different ratios of $\lambda/\mu$ and amounts of the service channels.

The data in FIG. 6 indicates that utilization rate for the online service system including only one service channel is 0.8333, and that is, probability of the system being idle is 0.1667. In such situation, average number of the users waiting in the queuing mode is 4.1667, and on average they have to wait 41.667 minutes. It's obvious that one couldn't be satisfied to wait about 41 minutes in the queuing mode for acquiring service about 10 minutes.

By means of the evaluation mode, the manager can easily compare merits and demerits of systems including one, two and three service channels. Though the systems including two or three service channels could be idle for a longer time, however the users will be much more satisfied as the waiting time is shorter.

As described in the above, advantages of the present invention can be summarized as follows:

1. The waiting time is predicted precisely in accordance with regression analysis of the queuing mode, and can be dynamically shown to the users.
2. More complete services are provided to the users through the electronic whiteboard mode with an operation interface of transmitting audio/video, pictures and characters and capturing desktop.
3. The cost on service channels can be effectively balanced with the users' demands according to the performance evaluation mode.

While the present invention has been described as the preferred embodiments, any modifications deduced from these embodiments should still belong to the scope of the present invention.

What is claimed is:

1. An online service system, which provides a user real time service through one or more service channels and can show the user predicted waiting time through a queuing mode if the all service channels are busy, wherein the queuing mode comprises:
    a queuing-user counting unit which counts number of queuing users entering the queuing mode and waiting for service;
    a service channel counting unit which counts number of service channels providing service; and a waiting-time prediction unit which dynamically shows the queuing user a predicted waiting time determined according to an average service interval obtained from a regression analysis at the present time,
    wherein the regression analysis is executed according to a distribution of service intervals at the present time:
    $Y=\beta 0+(\beta 1\times X1)+(\beta 2\times X2)+(\beta 3\times X3)$, wherein Y is a service interval,
    X2 is a reasonable or moderate service interval within a reasonable range defined as a range of time that most users spend,
    X1 is a shorter service interval beyond the reasonable range and spent by relatively few users,
    X3 is a longer service interval beyond the reasonable range and spent by relatively few users,
    $\beta 0$, $\beta 1$, $\beta 2$ and $\beta 3$ are regression coefficients;
    accordingly, the queuing user can be clear on the waiting time and then will exit the queuing mode and enter a service channel as the waiting time ends or any service channel is available.
2. The online service system as claimed in claim 1, wherein the distribution of service intervals follows Chebyshev's Empirical Rule, in which 95% of the users spend time within the reasonable range ($\mu+2s$, $\mu-2s$), 2.5% of the users spend time less than $\mu-2s$, and 2.5% of the users spend time more than $\mu+2s$; wherein $\mu$ is an average of the service intervals and s is a standard deviation for N users, N is an integer larger than 1.
3. The online service system as claimed in claim 1, further comprising an electronic whiteboard mode for serving the users who enter service channels either directly or after exiting from the queuing mode, wherein the electronic whiteboard mode comprises:
    an audio/video transmitting unit for transmitting audio/video information;
    a real-time electronic whiteboard unit for the users to input data in real time;
    an animation unit for playing animations;
    a picture/character transmitting unit for transmitting pictures and characters; and
    a desktop-capturing unit for capturing data from a desktop.
4. The online service system as claimed in claim 1, further comprising a performance evaluation mode which determines performance of the service channels according to probability of the users entering the service channels and numbers of the users served by service channels per unit time, and number of the service channels.
5. The online service system as claimed in claim 4, wherein the performance evaluation mode applies the following formulae to calculating the probability ($\lambda$) of the users entering a single service channel and the number ($\mu$) of the users served by the service channel per unit time:
    (1) probability of no user entering the online service system:

$$p_0 = 1 - \frac{\lambda}{\mu}$$

(2) average number of the users entering the queuing mode:

$$Lq = \frac{\lambda^2}{\mu(\mu - \lambda)}$$

(3) average number of the users in the online service system:

$$L = Lq + \frac{\lambda}{\mu}$$

(4) average time for one user spending in the queuing mode:

$$Wq = \frac{Lq}{\lambda}$$

(5) average time for one user spending in the online service system:

$$W = Wq + \frac{1}{\mu}$$

(6) probability of the users waiting for service:

$$p_w = \frac{\lambda}{\mu}$$

(7) probability of N users entering the online service system:

$$p_n = \left(\frac{\lambda}{\mu}\right)^n P_0.$$

6. The online service system as claimed in claim 4, wherein the performance evaluation mode applies the following formulae to calculating the probability ($\lambda$) of the users entering k service channels and the numbers ($\mu$) of the users served by the service channels per unit time:

(1) probability of no user entering the online service system:

$$p_0 = \frac{1}{\sum_{n=0}^{k-1} \frac{(\lambda/\mu)^n}{n!} + \frac{(\lambda/\mu)^k}{k!}\left(\frac{k\mu}{k\mu-\lambda}\right)}$$

(2) average number of the users entering the queuing mode:

$$Lq = \frac{(\lambda/\mu)^k \lambda\mu}{(k-1)!(k\mu-\lambda)^2} P_0$$

(3) average number of the users in the online service system:

$$L = Lq + \frac{\lambda}{\mu}$$

(4) average time for one user spending in the queuing mode:

$$Wq = \frac{Lq}{\lambda}$$

(5) average time for one user spending in the online service system:

$$W = Wq + \frac{1}{\mu}$$

(6) probability of the users waiting for service:

$$p_w = \frac{1}{k!}\left(\frac{\lambda}{\mu}\right)^k \left(\frac{k\mu}{k\mu-\lambda}\right) p_0$$

(7) probability of N users entering the online service system:

$$p_n = \frac{(\lambda/\mu)^n}{n!} p_0 \quad \text{for } n \leq k$$
$$p_n = \frac{(\lambda/\mu)^n}{k! k^{(n-k)}} p_0 \quad \text{for } n \geq k$$

7. The online service system as claimed in claim 1, wherein the queuing mode comprises an interface for showing number of the queuing users, number of the service channels providing service, waiting time predicted by the waiting-time prediction unit, and a search engine for the queuing users to search for information from a database.

\* \* \* \* \*